US006234439B1

(12) United States Patent
Townsend et al.

(10) Patent No.: US 6,234,439 B1
(45) Date of Patent: May 22, 2001

(54) ILLUMINATED CUP HOLDER ASSEMBLY

(75) Inventors: Brad Steven Townsend, Smithville; James Burr Anderson; George Robert Hulse, both of Cookeville, all of TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/457,212

(22) Filed: Dec. 8, 1999

(51) Int. Cl.[7] .............................. A47K 1/09; F21V 33/00
(52) U.S. Cl. .................. 248/311.2; 362/562; 248/309.1; 248/310; 248/346.11
(58) Field of Search ........................... 248/346.11, 311.2, 248/312.1, 146, 176.1, 148, 309.1, 310, 314, 315, 312; 362/562, 551, 488, 101

(56) References Cited

U.S. PATENT DOCUMENTS

| 2,259,910 | 10/1941 | Rylsky . | |
| 2,555,716 | * 6/1951 | TodHunter . | |
| 2,745,946 | 5/1956 | Protzmann . | |
| 4,254,452 | 3/1981 | Switala . | |
| 4,446,508 | 5/1984 | Kinzie . | |
| 4,583,707 | * 4/1986 | Anderson | 248/293 |
| 4,788,630 | * 11/1988 | Gavagan . | |
| 4,918,577 | 4/1990 | Furudate . | |
| 5,024,411 | * 6/1991 | Elwell | 248/311.2 |
| 5,037,162 | 8/1991 | Ransom . | |
| 5,195,711 | 3/1993 | Miller et al. . | |
| 5,375,805 | 12/1994 | Sudak et al. . | |
| 5,590,945 | * 1/1997 | Simms | 362/31 |
| 5,634,621 | * 6/1997 | Jankovic | 248/311.2 |
| 5,673,891 | * 10/1997 | Fujihara et al. | 248/311.2 |
| 5,915,832 | 6/1999 | Baird, Sr. . | |
| 5,984,497 | * 11/1999 | Foerstner et al. | 362/511 |
| 6,139,176 | * 10/2000 | Hulse et al. | 362/581 |

* cited by examiner

*Primary Examiner*—Anita M. King
*Assistant Examiner*—Steven Marsh
(74) *Attorney, Agent, or Firm*—Reising, Ethington, Barnes, Kisselle, Learman & McCulloch, P.C.

(57) ABSTRACT

An illuminated cup holder assembly (10,10') generally includes an elongated waveguide (12,12'), a cup holder bottom portion (14,14'), and a cup holder top portion (16, 16'). The cup holder bottom portion (14,14') includes a waveguide support (22,22') disposed above a base (18,18'), with at least a portion of the waveguide (12,12') disposed on the waveguide support. The cup holder top portion (16,16') includes a shield (24,24') extending over the waveguide (12,12'). This assembly (10,10') splits the cup holder in two wherein the two pieces (14,14' and 16,16') create a pocket to hold the waveguide (12,12') in place. In other words, the top and bottom portions (14,14' and 16,16') sandwich the waveguide (12,12') into place.

12 Claims, 2 Drawing Sheets

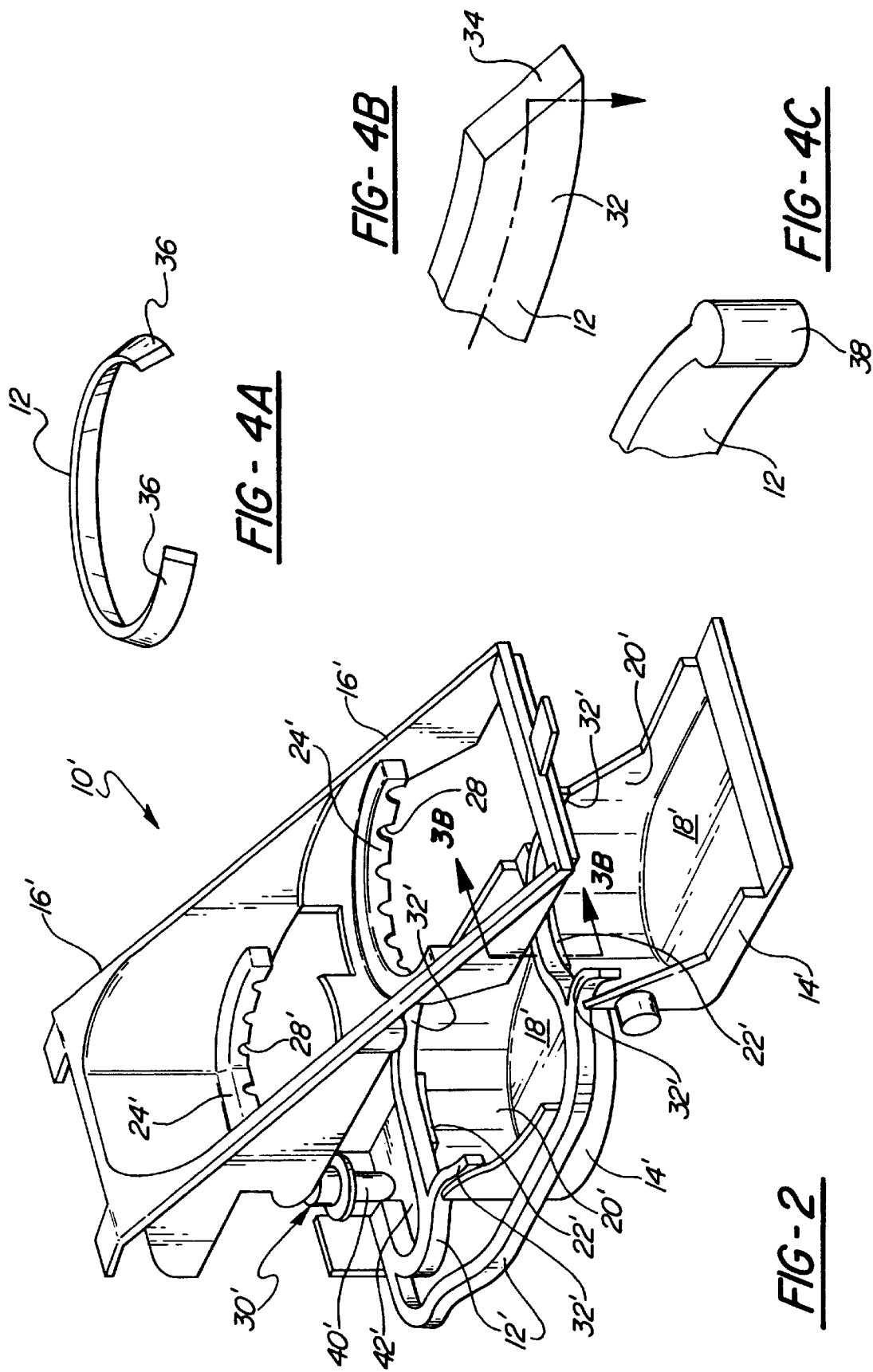

ILLUMINATED CUP HOLDER ASSEMBLY

TECHNICAL FIELD

The subject invention relates to distributed lighting systems, and particularly distributed lighting systems involving the use of waveguides to illuminate portions of a vehicle interior.

BACKGROUND OF THE INVENTION

Distributed lighting systems distribute light from some central location to one or more remote locations. A distributed lighting system promises several advantages over conventional lighting techniques, including low power consumption, extended life, heat reduction where light is emitted, and increased design flexibility.

Waveguides provide one useful way to distribute light. Waveguides are lengths of plastic that propagate light through internal reflection. Vehicle makers have adapted waveguides for use in many locations in a vehicle. For example, several U.S. Pat. Nos. including 4,788,630 and 5,590,945 show waveguides that illuminate various parts of a vehicle interior. Until recently, it has been difficult to install waveguides into certain small areas such as cup holders. This is particularly true when the demands of mass production impact upon the design of the product. For example, parts makers constantly seek designs that are simpler, easier and cheaper to make, and more reliable.

SUMMARY OF THE INVENTION AND ADVANTAGES

The cup holder assembly generally includes an elongated waveguide, a cup holder bottom portion, and a cup holder top portion. The cup holder bottom portion includes a base and a side wall extending up from the base to define a cup-receiving space. The bottom portion further includes a waveguide support disposed above the base, with at least a portion of the waveguide disposed on the waveguide support. The cup holder top portion is disposed over the bottom portion and the waveguide. The top portion includes a shield extending over the waveguide.

This system splits the cup holder in two wherein the two pieces create a pocket to hold the waveguide in place. In other words, the top and bottom portions sandwich the waveguide into place. This design allows for simple, fast, and inexpensive installation of the waveguide into the cup holder space.

FIGURES IN THE DRAWINGS

Other advantages of the present invention will be readily appreciated as the same becomes better understood by reference to the following detailed description when considered in connection with the accompanying drawings wherein:

FIG. 2 is a perspective bottom view showing a second embodiment of the subject invention with the cup holder top portion removed from the cup holder bottom portion;

Figure 3A:
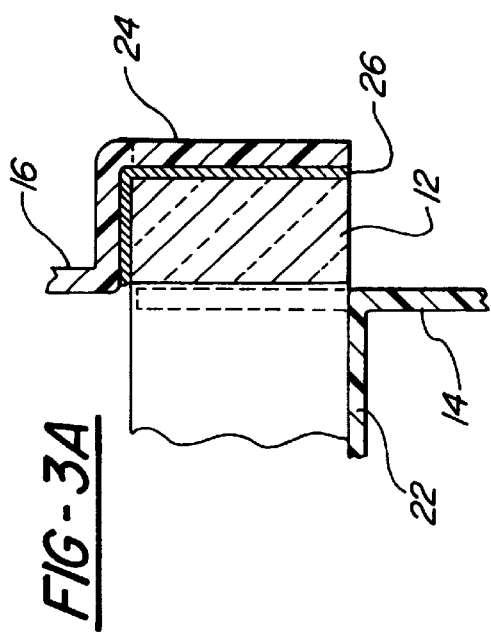
FIG. 3A is a section view taken along lines 3A—3A in FIG. 1.
Figure 3B:
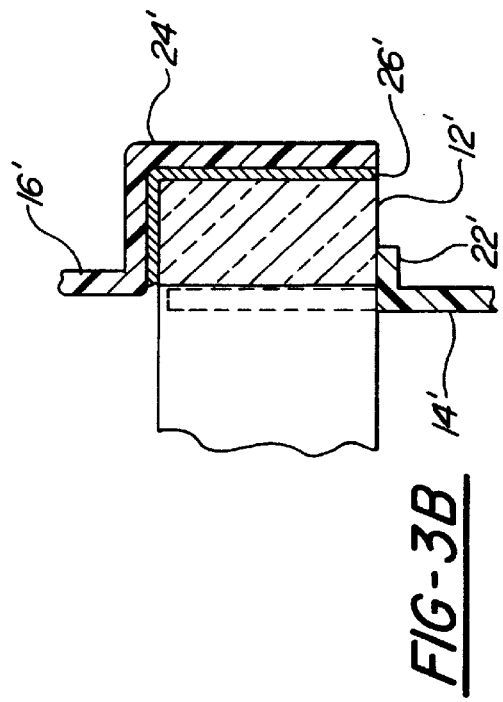
FIG. 3B is a section view taken along lines 3B—3B of FIG. 2.

FIGS. 4A–C show different ways in which the branch ends of the waveguides can be configured to increase the amount of light that is directed downwardly into the cup holder.

DESCRIPTION OF THE PREFERRED EMBODIMENT

Referring to the Figures wherein like numerals indicate like or corresponding parts throughout the several views, an illuminated cup holder assembly is generally shown at 10, 10'.

The cup holder assembly 10, 10' generally includes an elongated waveguide 12,12', a cup holder bottom portion 14,14', and a cup holder top portion 16,16'. The cup holder bottom portion 14,14' includes a base 18,18' and a side wall 20, 20' extending up from the base to define a cup-receiving space. The bottom portion 14,14' further includes a waveguide support 22,22' disposed above the base 18,18', with at least a portion of the waveguide 12, 12' disposed on the waveguide support 22, 22'. The cup holder top portion 16,16' is disposed over the bottom portion 14, 14' and the waveguide 12, 12'. The top portion 16, 16' includes a shield 24, 24' extending over the waveguide 12, 12'. This system 10,10' splits the cup holder in two wherein the two pieces 14,14' and 16,16' create a pocket to hold the waveguide 12,12' in place. In other words, the top and bottom portions 14,14', 16,16' sandwich the waveguide 12,12' into place.

In one embodiment, the waveguide support 22 is outside the cup-receiving space. FIG. 1A shows a small shelf or ledge 22 formed on the outside of the side wall 20 of each space.

In another embodiment, the waveguide support 22' is disposed inside the cup receiving space, on the inside of the side wall 20' of each space. This is shown in FIG. 1B. Here the support 22' is a ledge molded into the side wall 20' having an arcuate shape matching the inside contour of the side wall 20'.

In either embodiment, the waveguide support 22,22' extends under only a portion of the waveguide 12,12'. There is no need for the support 22,22' to extend under large portions of the waveguide 12,12' because the waveguide is not very heavy, and an extensive support might unduly interfere with light emitting from the waveguide.

The basic function of the shield 24,24' is to direct the light downwardly into the cup-receiving space and not upwardly where it might cause irritating glare. In the preferred embodiments, the interior of the shield 24,24' includes a reflective surface or coating 26,26' to maximize the light that is directed down and out into the cup-receiving space. Reflective surfaces 26,26' on the shield 24,24' may be formed by vapor deposition on plastic or other materials.

In some embodiments it is beneficial to have the shield 24,24' defining at least one notch 28' for emitting additional light from the waveguide 12,12'. This could be important in the FIG. 2 embodiment where the support 22' extends under a portion of the waveguide 12,12' and reduces some of the light directed downwardly into the cup-receiving space.

Each waveguide 12,12' includes a base end disposed outside the cup-receiving space and a distal end that extends into the cup-receiving space. The base end is disposed near a light source generally indicated at 30,30'—such as a light bulb. The distal end includes at least one branch 32,32' extending along the inside of the side wall 20,20' and underneath the shield 24,24' to cast illumination downwardly into the cup-receiving space. Preferably, the waveguide distal end includes two branches. This has the effect of increasing the light that is distributed into the cup-receiving space. The waveguide 12,12' is made from suitable material known to persons of ordinary skill in the art (e.g. acrylic); and is injection molded into the desired shape.

The waveguide 12,12' has a generally rectangular cross-section, with the longer sides oriented in a manner that is generally vertical. The waveguide may include stippling along the top to further increase light output in the downward direction.

According to one embodiment, shown in FIG. 4B, the branches 32, 32' include chamfered ends 34. This arrangement has the effect of increasing the light that is directed downwardly into the cup-receiving space.

To achieve the same effect—i.e. increasing the amount of light directed downwardly—one may also adopt another embodiment wherein the branches 32,32' include twisted ends 36 as shown in FIG. 4A. This embodiment makes use of light emitting from the sides of the waveguides.

In yet another embodiment, shown in FIG. 4C, the branches 32,32' include enlargements 38 on the ends. This also increases the amount of light distributed into the cup-receiving space. Indeed, there are several other ways that the waveguide (12,12') can be configured in order to increase the light output. For example, the waveguide (12, 12') can be chamfered on the top or the sides. Several appropriate designs are within the skill of persons in the art.

Figure 1:
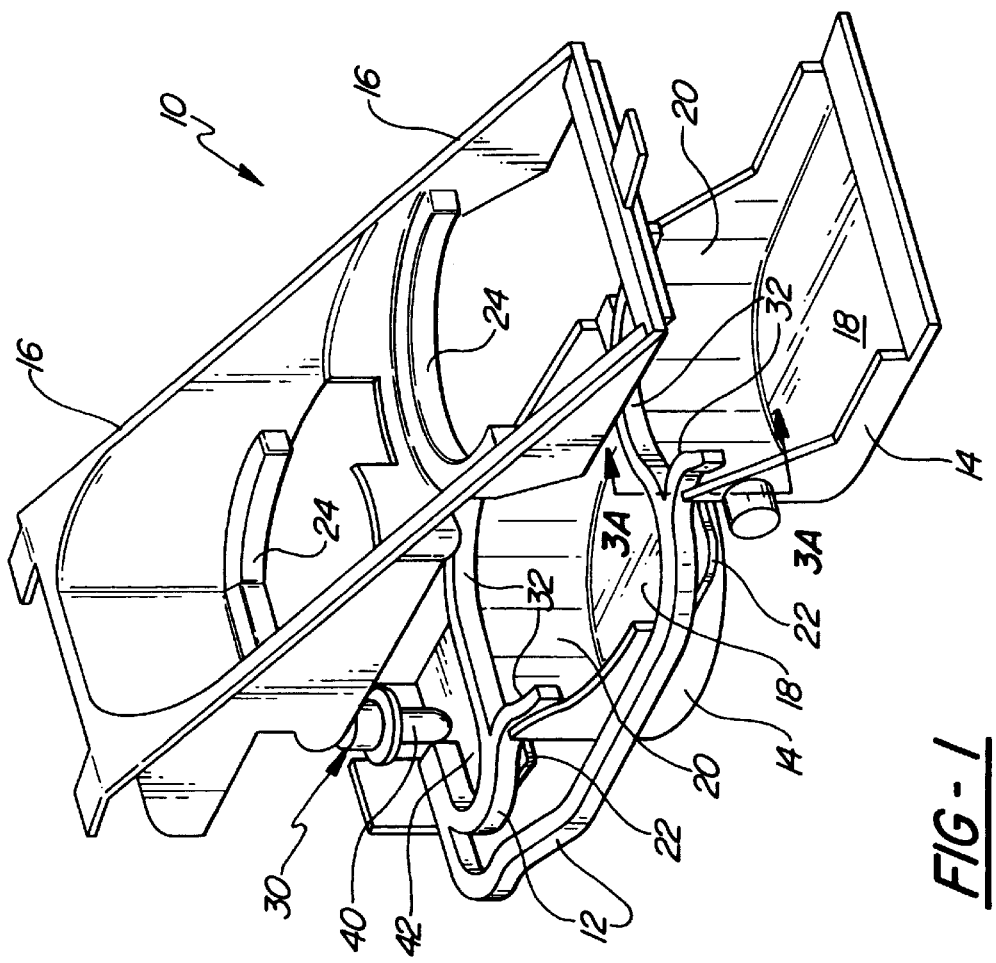
FIG. 1 is a perspective view showing one embodiment of the subject invention with the cup holder top portion removed from the cup holder bottom portion.

The embodiments shown in FIGS. 1 and 2 involve waveguides 12,12' that branch or split inside the cup holder space. This arrangement is beneficial because it provides a desirable light pattern. However, there is a possibility that the branch 32,32' may lead to a dark area inside the cup holder. As discussed and illustrated in co-pending U.S. application Ser. No. 09/009,836, this can be overcome by disposing a web piece (not shown) of waveguide material in the location where the waveguide 12,12' branches. The web portion is thinner than the rest of the waveguide 12,12' and provides additional illumination to the portion of the cup holder 10 that is directly beneath the location where the waveguide material branches. The web piece extends across a portion of the gap formed by the branches 32,32' to assume somewhat of a triangular shape.

Another way to avoid the dark area is to dispose a tab (not shown) in place of the web piece. The tab assumes more of a rectangular shape than the web piece. The tab may not extend as far as the web piece in the lateral direction, but it extends farther out (i.e. away from the branch), and it could angle or bend downwardly whereas the web piece does not do this.

There is yet another embodiment that might be appropriate for situations where the waveguide 12,12' branches. In some of these situations, light travelling through the waveguide 12,12' will split unequally between the two branches 32,32'. This is especially true when there is a primary branch and a shorter secondary branch. In order to balance the light in the two arms and provide for more uniform illumination in the cup holder, one could give the secondary branch a smaller cross-section (i.e. one that is thinner and narrower than the primary branch). This allows less light to enter the secondary branch and balances the light to the two branches.

There are other possible waveguide configurations—other than the branching configurations just discussed and shown in FIGS. 1 and 2. For example, the waveguide 12,12' might have a loop or circular shape. The exact configuration will depend on the shape of the cup holder space.

The assembly 10 may or may not include some sort of compact light source 30. As shown in the figures, the light source 30, 30' may include a housing 42,42' having a reflective interior, and a bulb 40,40' positioned within the housing. The light source 30, 30' may also include a color filter (not shown) between the bulb 40,40' and the waveguide 12,12' to produce illumination of a desired color in the cup holder space. If the assembly 10 does not include the light source, the waveguide 12,12' should extend to some other remote light source.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A cup holder assembly for use in a vehicle comprising:

an elongated waveguide;

a cup holder bottom portion including a base and a side wall extending up from the base to define a cup-receiving space, the bottom portion further including a waveguide support disposed above the base, with at least a portion of the waveguide disposed on the waveguide support;

a cup holder top portion disposed over the bottom portion and the waveguide, the top portion including a shield extending over the waveguide, whereby said waveguide is adapted to distribute light at said cup holder.

2. The illuminated cup holder assembly of claim 1 wherein the waveguide support is outside the cup-receiving space.

3. The illuminated cup holder assembly of claim 1 wherein the waveguide support is inside the cup receiving space.

4. The illuminated cup holder assembly of claim 3 wherein the waveguide support extends under only a portion of the waveguide.

5. The illuminated cup holder assembly of claim 1 wherein the interior of the shield is reflective.

6. The illuminated cup holder assembly of claim 1 wherein the shield defines at least one notch for emitting light from the waveguide.

7. The illuminated cup holder assembly of claim 1 wherein the waveguide includes a base end disposed outside the cup-receiving space and a distal end extending into the cup-receiving space, the distal end including at least one branch extending along the side wall and underneath the shield to cast illumination downwardly into the cup-receiving space.

8. The illuminated cup holder assembly of claim 7 wherein the waveguide has a generally rectangular cross-section.

9. The cup holder assembly of claim 8 wherein the waveguide distal end includes two branches.

10. The illuminated cup holder assembly of claim 9 wherein the branches include chamfered ends.

11. The illuminated cup holder assembly of claim 9 wherein the branches include twisted ends.

12. The illuminated cup holder assembly of claim 9 wherein the branches include enlarged ends.

* * * * *